United States Patent
Yang et al.

(10) Patent No.: US 9,468,328 B2
(45) Date of Patent: Oct. 18, 2016

(54) STEAM COOKING APPLIANCE

(71) Applicant: LG ELECTRONICS INC., Seoul (KR)

(72) Inventors: Jaekyung Yang, Seoul (KR); Yangkyeong Kim, Seoul (KR); Eunkyoung Yoon, Seoul (KR); Hyeunsik Nam, Seoul (KR); Sungho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 314 days.

(21) Appl. No.: 14/199,792

(22) Filed: Mar. 6, 2014

(65) Prior Publication Data

US 2014/0251158 A1    Sep. 11, 2014

(30) Foreign Application Priority Data

Mar. 6, 2013    (KR) .................. 10-2013-0023689
May 31, 2013   (KR) .................. 10-2013-0062364

(51) Int. Cl.
| | | |
|---|---|---|
| A47J 27/00 | (2006.01) | |
| A47J 27/04 | (2006.01) | |
| A21B 3/04 | (2006.01) | |
| F24C 15/32 | (2006.01) | |

(52) U.S. Cl.
CPC .................. *A47J 27/04* (2013.01); *A21B 3/04* (2013.01); *F24C 15/327* (2013.01); *A47J 2027/043* (2013.01)

(58) Field of Classification Search
CPC ........ F24C 15/327; A21B 3/04; A47J 27/04; A47J 2027/043
USPC .................. 99/473, 474, 476, 468; 126/369; 219/401, 682

See application file for complete search history.

(56) References Cited

U.S. PATENT DOCUMENTS

| | | | | |
|---|---|---|---|---|
| 3,518,949 A | * | 7/1970 | Stock .................. | A21C 13/00 219/400 |
| 5,515,773 A | * | 5/1996 | Bullard .................. | A47J 27/04 126/20 |
| 7,045,745 B2 | * | 5/2006 | Kim .................. | F24C 15/327 126/348 |
| 7,091,454 B2 | * | 8/2006 | Cho .................. | F24C 15/327 219/401 |
| 7,537,004 B2 | * | 5/2009 | Reay .................. | F24C 15/327 126/20 |
| 7,867,534 B2 | * | 1/2011 | Sells .................. | F24C 15/327 126/20 |
| 8,697,166 B2 | * | 4/2014 | Embury .................. | A23L 1/0121 426/510 |
| 8,925,445 B2 | * | 1/2015 | Park .................. | F24C 14/005 126/20 |
| 2007/0215592 A1 | | 9/2007 | Wang | |
| 2010/0064902 A1 | * | 3/2010 | Sakane .................. | F24C 15/327 99/352 |
| 2012/0024164 A1 | | 2/2012 | Park et al. | |

FOREIGN PATENT DOCUMENTS

| | | | | |
|---|---|---|---|---|
| DE | 2257365 | * | 3/1974 | .............. A21B 3/04 |
| DE | 102007041822 A1 | | 3/2009 | |
| DE | 102007048200 A1 | | 4/2009 | |
| DE | 102010027844 A1 | | 3/2011 | |
| EP | 1724529 A1 | | 11/2006 | |
| EP | 2466214 A1 | | 12/2011 | |

* cited by examiner

Primary Examiner — Reginald L Alexander
(74) Attorney, Agent, or Firm — Dentons US LLP

(57) ABSTRACT

Provided is a steam cooking appliance. The steam cooking appliance includes a main body having a cavity that provides a cooking space in which a food is accommodated, a water tank separably coupled to the main body outside the cavity, and a steam supply unit disposed outside the cavity to heat water supplied from the water tank to generate steam, the steam supply unit supplying the generated steam into the cooking space within the cavity.

14 Claims, 11 Drawing Sheets

STEAM COOKING APPLIANCE

CROSS-REFERENCE TO RELATED APPLICATIONS

The present application claims priority under 35 U.S.C. 119 and 35 U.S.C. 365 to Korean Patent Application No. 10-2013-0023689 (filed on Mar. 6, 2013), and Korean Patent Application No. 10-2013-0062364 (filed on May 31, 2013), which are hereby incorporated by reference in their entirety as if fully set forth herein.

BACKGROUND

The present disclosure relates to a steam cooking appliance.

Steam cooking appliances are cooking appliances for cooking foods by using steam. Such a steam cooking appliance includes a steam generation unit for generating steam and a water supply unit for supplying water into the steam generation unit.

The steam cooking appliance according to the related art includes a housing having a cooking chamber, a water supply part, and a steam generator having evaporation elements for generating steam that is introduced into the cooking chamber. Also, a port through which a user pours water is provided in the water supply part.

In case of the steam cooking appliance according to the related art, there are inconveniences in which water has to be directly poured into the water supply part, and the port such as a water pipe had to be connected to the water supply part. To solve the above-described limitations, a steam cooking appliance including a water tank has been developed.

When the above-described steam cooking appliance is used, even though the user may easily supplement water, a cooking space may be reduced according to a volume that is occupied by the water tank. On the other hand, in a case where the water tank has a small size to secure the sufficient cooking space, the steam supply may be stopped because of the storage of water during the cooking.

SUMMARY

Embodiments provide a steam cooking appliance.

In one embodiment, a steam cooking appliance includes: a main body having a cavity that provides a cooking space in which a food is accommodated; a water tank separably coupled to the main body outside the cavity; and a steam supply unit disposed outside the cavity to heat water supplied from the water tank, thereby generating steam, the steam supply unit supplying the generated steam into the cooking space within the cavity.

In another embodiment, a steam cooking appliance includes: a main body having a cavity that provides a cooking space in which a food is accommodated; a backguard including an extension unit extending upward from the main body and a control unit disposed on the extension unit; a water tank disposed on the backguard; and a steam supply unit disposed outside the cavity to heat water supplied from the water tank, thereby generating steam, the steam supply unit supplying the generated steam into the cooking space within the cavity.

In further another embodiment, a steam cooking appliance includes: a main body defining an outer appearance; a cavity disposed on one side of the main body to define a cooking space in which foods are received; a drawer unit disposed on the other side of the main body, the drawer unit including a drawer that is insertable into or withdrawable from the main body and warming a container accommodated in the drawer; a water tank disposed on the drawer, the water tank being inserted or withdrawn together with the drawer; a steam supply unit heating water introduced from the water tank to generate steam, the steam supply unit including an injection part for supplying the generated steam into the cooking space; and a water supply tube guiding the water to the steam supply unit.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present application. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
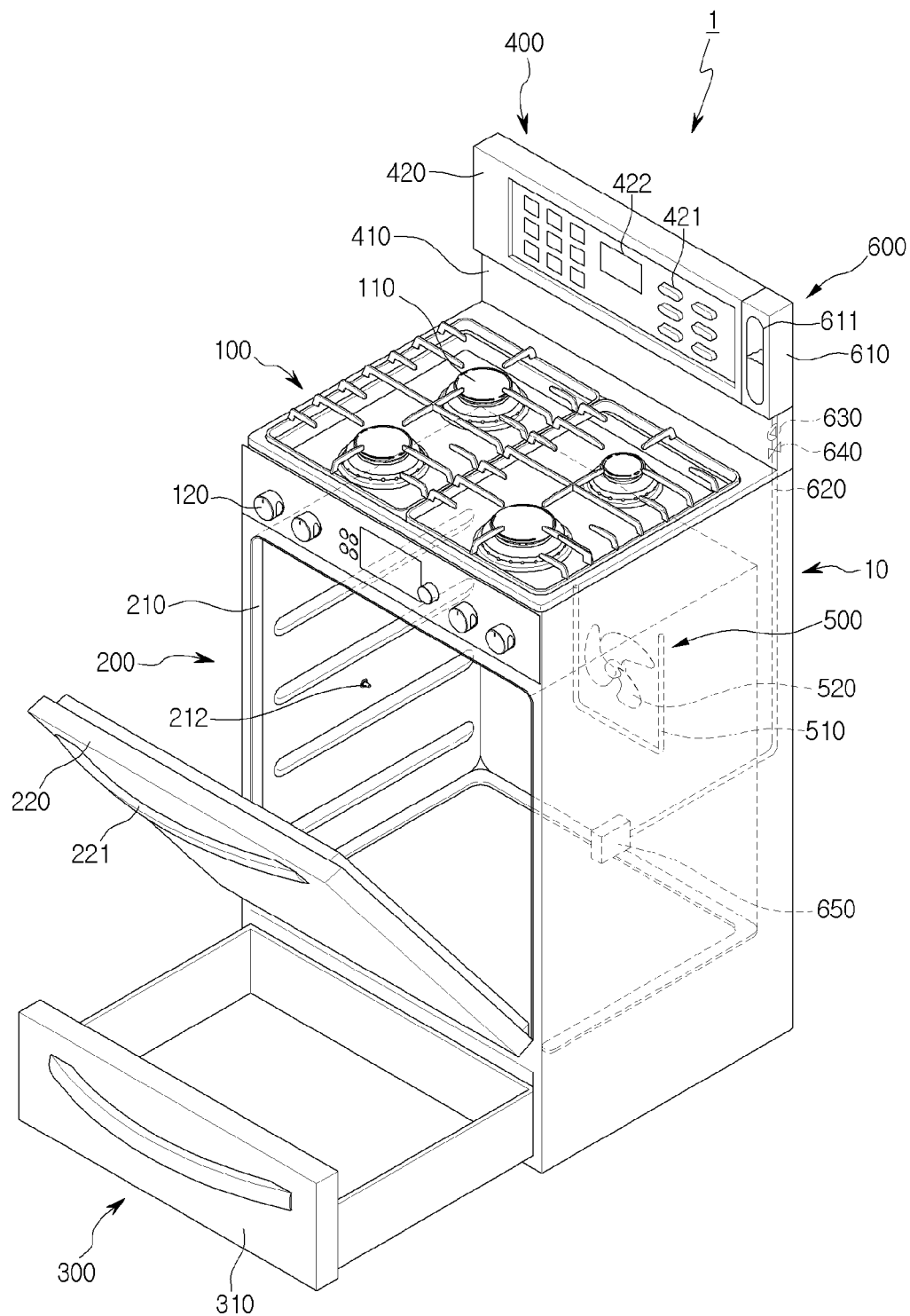
FIG. 1 is a perspective view of a water purifier according to a first embodiment.
Figure 2:
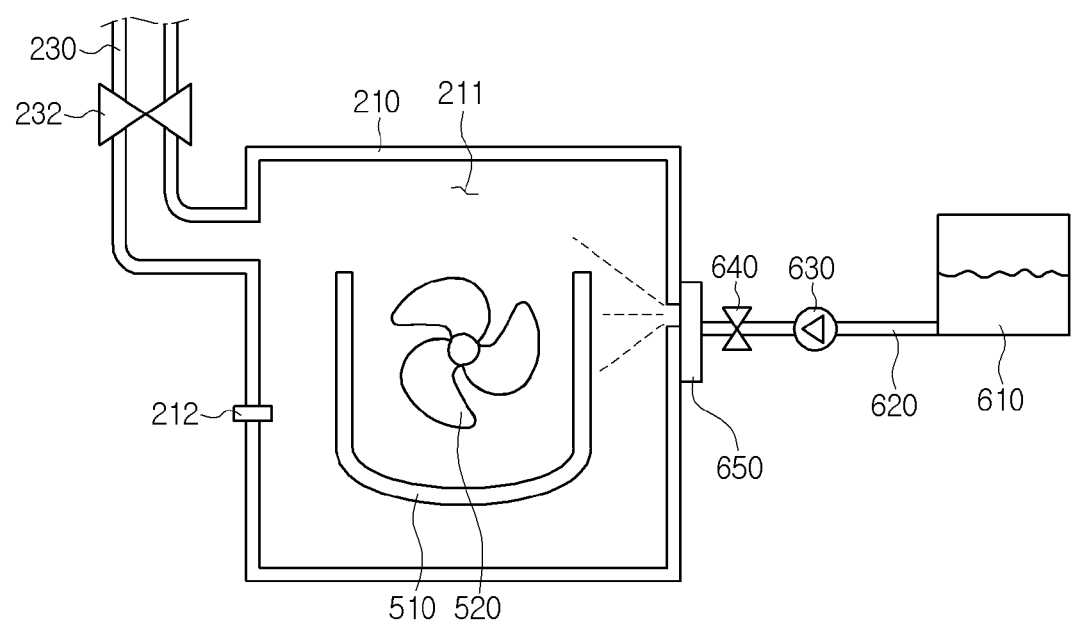
FIG. 2 is a schematic view illustrating a configuration of the steam cooking appliance according to the first embodiment.

FIG. 1 is a perspective view of a steam cooking appliance according to a first embodiment, and FIG. 2 is a schematic view illustrating a configuration of the steam cooking appliance according to the first embodiment.

Referring to FIGS. 1 and 2, a steam cooking appliance 1 according to the current embodiment may include a main body 10.

The main body 10 may include a cooktop unit 100, an oven unit 200, a drawer unit 300, a backguard 400, a heating device 500, and a steam device 600. The main body 10 may have a space that is partitioned into a plurality of spaces. Here, the cooktop unit 100, the oven unit 200, and the drawer unit 300 may be provided into the plurality of spaces, respectively. However, in the current embodiment, the cooktop unit 100 and the drawer unit 300 may be omitted.

The cooktop unit 100 may be disposed in an upper portion of the main body 10. That is, the cooktop unit 100 may be disposed above the oven unit 200 and the drawer unit 300. The cooktop unit 100 may include a plurality of cooktop burners 110. Each of the cooktop burners 110 may directly heat a container, which contains foods, by using flame that is generated by burning a gas to cook the foods. A plurality of knobs 120 are disposed on a front end of the cooktop unit 100. Each of the knobs 120 may adjust an opened degree of a valve for controlling gas supply and a gas supply amount into each of the cooktop burners 110.

The oven unit 200 may be provided at a central portion of the main body 10. That is, the oven unit 200 may be disposed between the cooktop unit 100 and the drawer unit 300. The oven unit 200 may include a cavity 210 having a cooking space 211 in which the foods are cooked, an oven door 220 for opening or closing the cavity 210, and an exhaust tube 230 connected to one side of the cavity 210.

The cavity 210 has both sidewalls, an upper wall, a rear wall, and a bottom wall. That is, the cavity 210 has an opened front surface. A temperature detection part 212 for measuring a temperature of the cooking space 211 may be disposed on a side of the cavity 210.

The temperature detection part 212 may directly or indirectly detect the temperature of the cooking space 211. The temperature detection part 212 may be disposed within the cavity 210 to directly detect the temperature of the cooking space 211 or may be disposed outside the cavity 210 to measure a temperature of the cavity 210, thereby indirectly measuring the temperature of the cooking space 211. The temperature detection part 212 may be a thermocouple, a thermistor, a resistance temperature detector (TTD), or an infrared thermometer. However, the present disclosure is not limited to a kind of temperature detection part 212.

The oven door 220 is rotatably connected to the main body 10. For example, the oven door 220 may open or close the cooking space 211 in a pull-down manner in which an upper end of the oven door 220 vertically rotates with respect to a lower end of the oven door 220. The current embodiment is not limited to an operation method of the oven door 220.

A door handle 221 that is grasped by a user's hand so as to rotate the oven door 220 may be disposed on an upper end of a front surface of the oven door 220.

The exhaust tube 230 may guide discharge of steam and heat within the cooking space 211. The exhaust tube 230 has one side connected to the cavity 210 and the other side communicating with the outside through an exhaust hole that is defined in a rear side of the steam cooking appliance 1. An exhaust valve 232 for allowing the exhaust tube 230 to communicate with the outside or blocking the exhaust tube 230 from the outside may be provided in the exhaust tube 230.

The exhaust valve 232 may block the exhaust tube 230 during the cooking to increase an internal temperature or moisture of the cooking space 211. When the cooking is completed, the exhaust tube 230 may communicate with the outside to discharge steam or heat within the cooking space 21 to the outside.

Alternatively, during the cooking, the exhaust valve 232 may be intermittently opened to adjust the internal temperature and/or moisture of the cooking space 211.

The drawer unit 300 may be disposed in a lower portion of the main body 10. That is, the drawer unit 300 may be disposed under the cooktop unit 100 and the oven unit 200. The drawer unit 300 may warm the container in which foods are contained. The drawer unit 300 may include a drawer 310, which is inserted into or withdrawn from the main body 10, for accommodating the container.

The backguard 400 may be disposed at a rear side of an upper end of the main body 10. The backguard 400 may include an extension unit 410 disposed at a rear side of the cooktop unit 400 and a control unit 420 disposed on the extension unit 410.

The extension unit 410 extends upward from a top surface of the main body 10. The extension unit 410 may support the control unit 420 to space the control unit 420 from the cavity 210 so that the control unit 420 does not have an influence on the heat of the cooktop unit 100 or the oven unit 200. That is, the extension unit 410 may be disposed between the control unit 420 and the cavity 210. A heat insulation part for blocking heat and/or an insulation part for blocking moisture may be provided on the extension unit 410.

Also, the exhaust tube 230 may be disposed within the extension unit 410. That is, a hole communicating with the outside may be defined in one surface of the extension unit 410.

A heat insulation part for blocking heat and/or an insulation part for blocking moisture may be provided on the control unit 420.

The control unit 420 may include an input part 421 for inputting a manipulation signal for operating the steam cooking appliance 1 and an output part 422 for outputting an operation state of the steam cooking appliance 1. The input part 421 may receive a manipulation signal for operating at least one of the cooktop unit 100, the oven unit 200, the drawer unit 300, a heating device 500, and a steam device 600. The output part 422 may display various information with respect to an operation of at least one of the cooktop unit 100, the oven unit 200, the drawer unit 300, a heating device 500, and a steam device 600 to the outside.

The heating device 500 may provide heat to an object to be cooked and accommodated into the oven unit 200. The heating device 500 may include a heating unit 510 for receiving a heating source to generate heat and a fan 520 for forcibly blowing air heated by the heating unit 510.

The heating unit 510 may be a burner for burning a gas to generate heat or an electric heater that generates heat by using applied current. However, the present disclosure is not limited to a kind of heating unit 510. The heating unit 510 is disposed on a side of the cooking space 211. For example, the heating unit 510 may be disposed on a rear side of the cooking space 211. The heating unit 510 may be disposed on at least one of both sidewalls, the upper wall, the rear wall, and the bottom wall of the cavity 210. The heating unit 510 may have a shape that surrounds the fan 520.

The fan 520 may allow the air heated by the heating unit 510 to convect within the oven unit 200. The fan 520 may be disposed on a side of the cooking space 211. The fan 520 may be disposed on a side of the heating unit 510.

The steam device 600 generates steam to supply the steam into the cooking space 211 within the oven unit 200. The steam device 600 may include a water tank, a water supply tube 620, a water supply pump 630, a water supply amount adjustment unit 640, and a steam supply unit 650.

Water for generating steam is stored in the water tank 610. The water tank 610 may be disposed outside the cooking space 211 to prevent the cooking space 211 of the steam cooking appliance 1 from being reduced in volume. Particularly, the water tank 610 may be disposed on a side of the backguard 400. The water tank 610 may be seated in an accommodation space that is defined in a side of the backguard 400.

The water tank 610 may be detachable from the backguard 400. For example, the water tank 610 may be withdrawn from the backguard 400 in one direction of upward, forward, and lateral directions.

An opening for confirming an amount of received water and a window disposed in the opening may be provided in the water tank 610. The window 611 may be disposed in a front surface of the water tank 610. The window 611 may not be separately provided. For example, the water tank 610 itself may be formed of a transparent material. Although not shown, a hole through which water is injected may be defined in a side of the water tank 610. Alternatively, the water may be injected through the hole communicating with the water supply tube 620 without forming the separate hole.

The water supply tube 620 may guide the water stored in the water tank 610 to the steam supply unit 650. The water supply tube 620 may have one side connected to the water tank 610 and the other side connected to the steam supply unit 650. The water supply tube 620 may be disposed within the backguard 400.

The water supply pump 630 may allow the water received in the water tank 610 to flow into the steam supply unit 650 through the water supply tube 620. The water supply pump 630 may be disposed on a side of the water supply tube 620. The water supply pump 630 may be an electromagnetic pump.

The water supply pump 630 may be disposed at an upper portion of the main body 10. For example, the water supply pump 630 may be disposed on one of the extension unit 410 of the backguard 400 and the control unit 420. That is, the water supply pump 630 may be spaced apart from the cavity 210.

The water supply amount adjustment unit 640 may be disposed on a side of the water supply tube 620 to adjust a flow of water flowing into the water supply tube 620.

The water supply amount adjustment unit 640 may be disposed between the water supply pump 630 and the steam supply unit 650. The water supply amount adjustment unit 640 may be disposed on the extension unit 410 of the backguard 400 or the control unit 420. That is, the water supply pump 630 may be spaced apart from the cavity 210.

The water supply amount adjustment unit 640 may be a valve for selectively opening or closing or a valve for adjusting an opened degree of the water supply tube 620.

The steam supply unit 650 may heat water introduced through the water supply tube 620 to generate steam to supply the generated steam into the cooking space 211. The steam supply unit 650 may include an evaporation element for heating and evaporating water, an injection nozzle for injecting the water that is evaporated by the evaporation element, and a compressor for injecting the vapor through the injection nozzle.

The steam supply unit 650 may be fixed to one sidewall of the cavity 210. In this case, a heat loss due to the movement of the steam generated in the steam supply unit 650 through a separate tube may be prevented, and a condensation phenomenon of the steam may be prevented.

Figure 3:
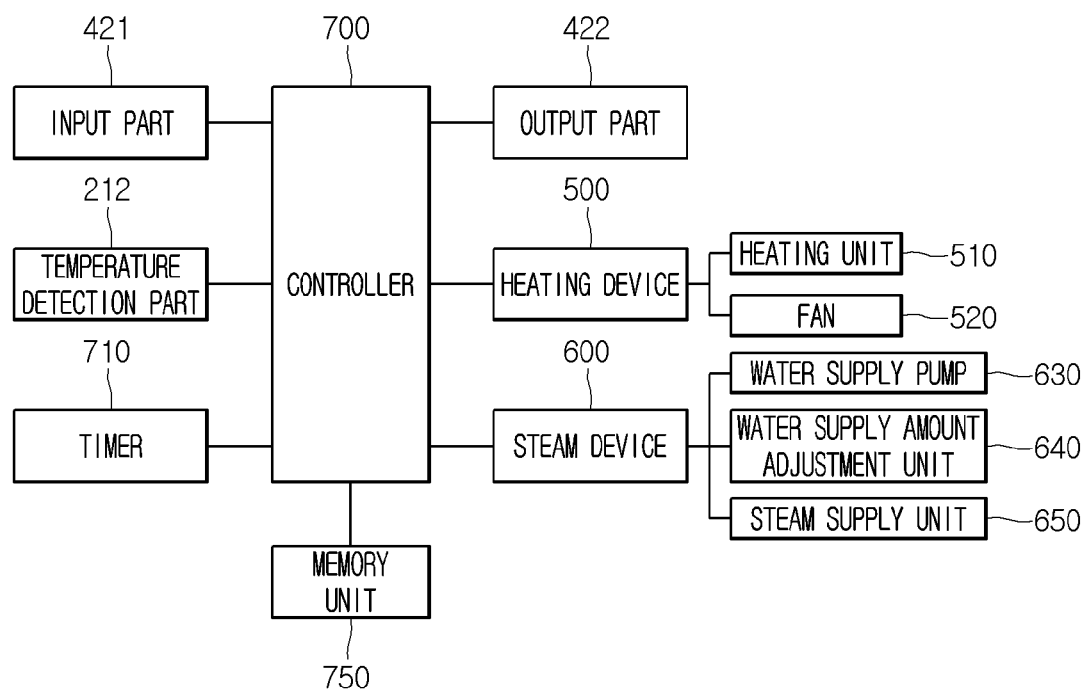
FIG. 3 is a block diagram of the steam cooking appliance according to the first embodiment.

FIG. 3 is a block diagram of the steam cooking appliance according to the first embodiment.

Referring to FIG. 3, the steam cooking appliance 1 according to the current embodiment may include a controller 700 for controlling an operation of the steam cooking appliance 1. The controller 700 may control operations of the output part 422, the heating device 500, and the steam device 600 on the basis of information transmitted from a timer 710 that measures a time with respect to operations of the input part 421, the temperature detection part 212, and the steam cooking appliance 1 and information stored in a memory unit 750 in which setting information with respect to an operation of the steam device 600 is stored.

According to the current embodiment, it may prevent the oven unit from being reduced in capacity due to the volume that is occupied by the water tank. As a result, the water tank may sufficiently increase in size regardless of the capacity of the oven unit to solve the above-described limitation in which the steam supply is stopped during the cooking. Also, the steam generation and supply units may be directly installed in the cavity to minimize the heat loss. Also, the various electronic components may be disposed sufficiently spaced from the cavity to prevent the electrical components from being damaged by the heat. Also, the steam injection and the electronic components may be sufficiently spaced apart from each other to prevent moisture from being permeated into the electronic components.

Figure 4:
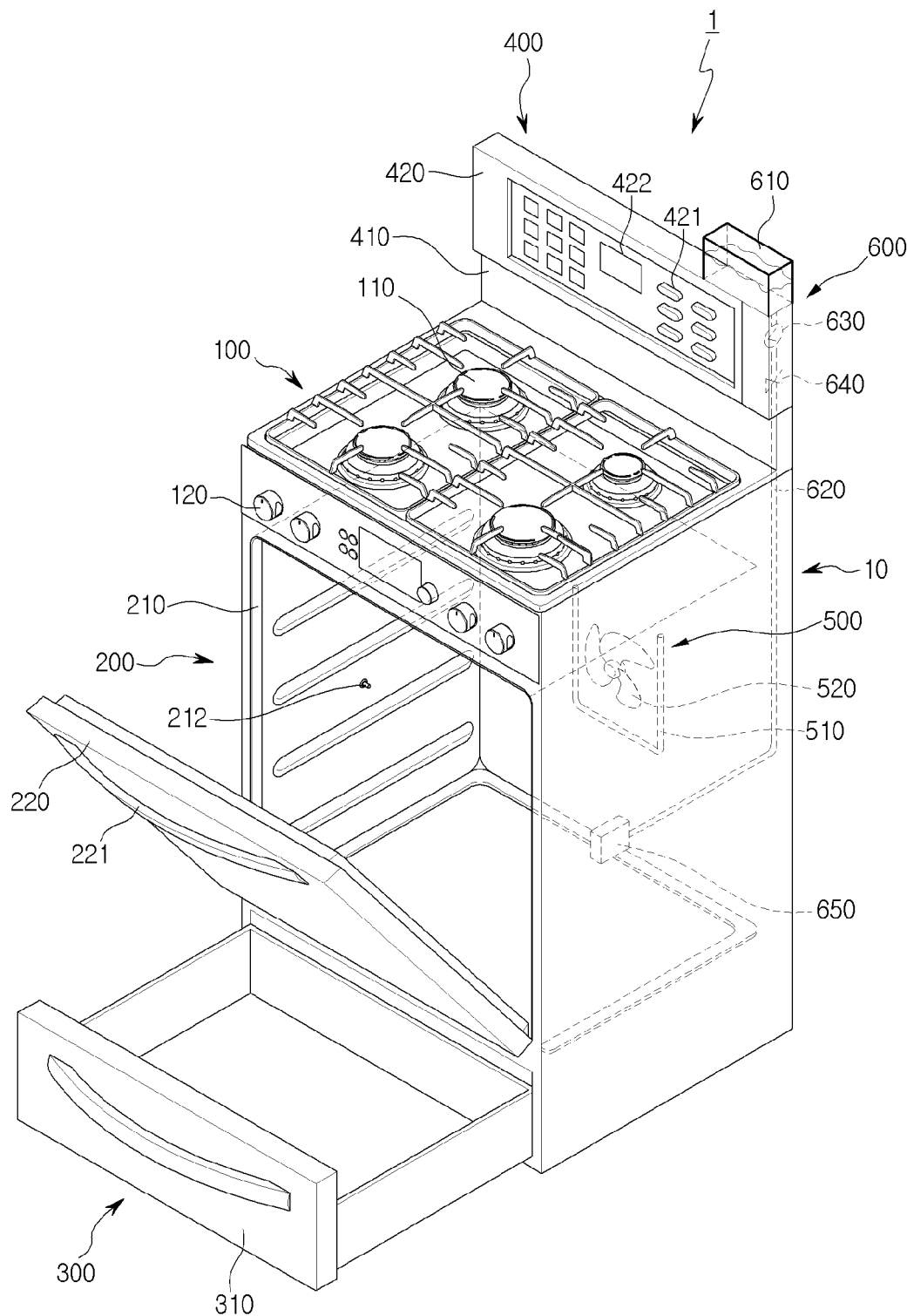
FIG. 4 is a perspective view of a steam cooking appliance according to a second embodiment.

FIG. 4 is a perspective view of a steam cooking appliance according to a second embodiment.

Referring to FIG. 4, a water tank 610 of a steam cooking appliance 1 according to the current embodiment may be detachably disposed on the outside of a backguard 400.

For example, the water tank 610 may be seated on an upper portion of the backguard 400. The water tank 610 may be formed of a transparent material so that an amount of water received in the water tank is seen from the outside.

A water supply tube 620 may be disposed to vertically pass through the inside of an extension unit 410 and a control unit 420. However, the position of the water supply tube 620 may vary according to the position of the water tank 610.

A water supply pump 630 may be disposed within the backguard 400. That is, the water supply pump 630 may be disposed at a position that is spaced from a cavity 210. The water supply pump 630 may be disposed within the control unit 420.

A water supply amount adjustment unit 640 may be disposed within the backguard 400. That is, the water supply amount adjustment unit 640 may be disposed at a position that is spaced from the cavity 210. The water supply amount adjustment unit 640 may be disposed within the control unit 420.

Figure 5:
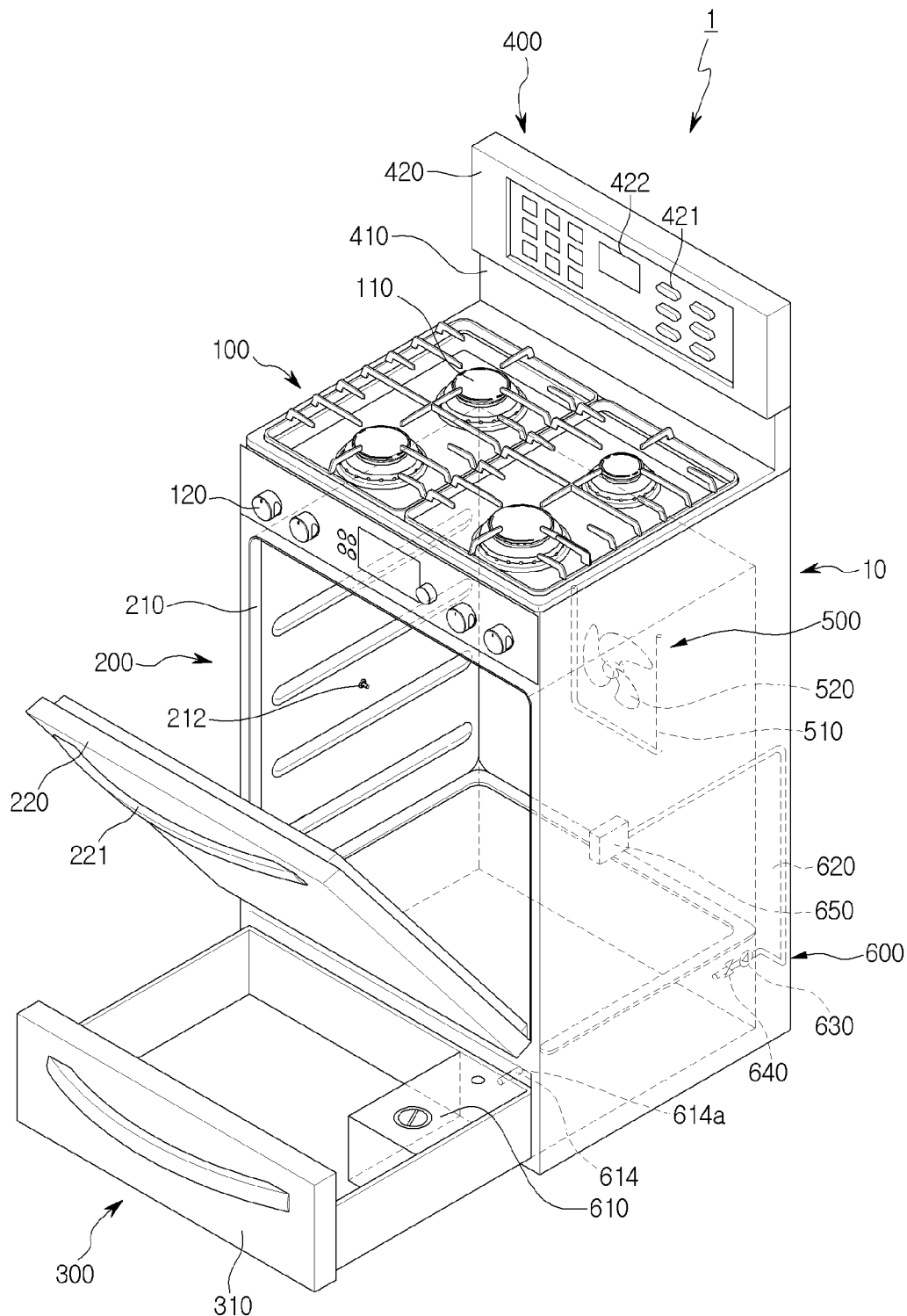
FIG. 5 is a perspective view of a steam cooking appliance according to a third embodiment.
Figure 6:
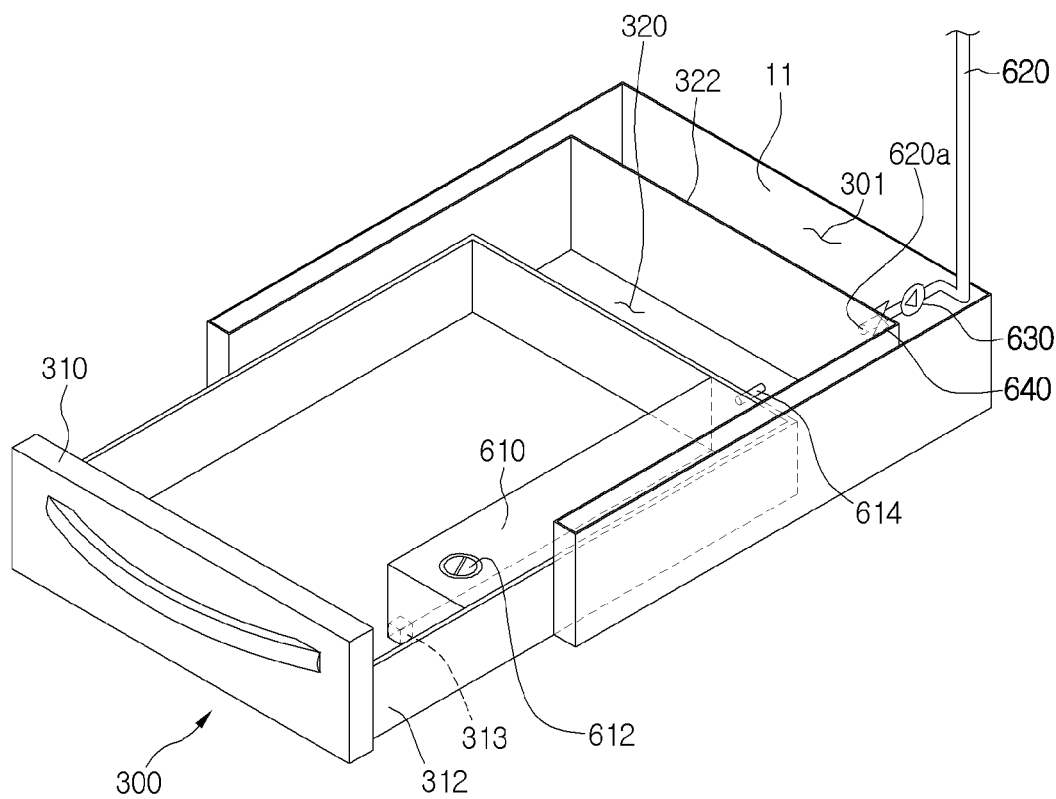
FIG. 6 is a partial perspective view of a drawer according to the third embodiment.
Figure 7:
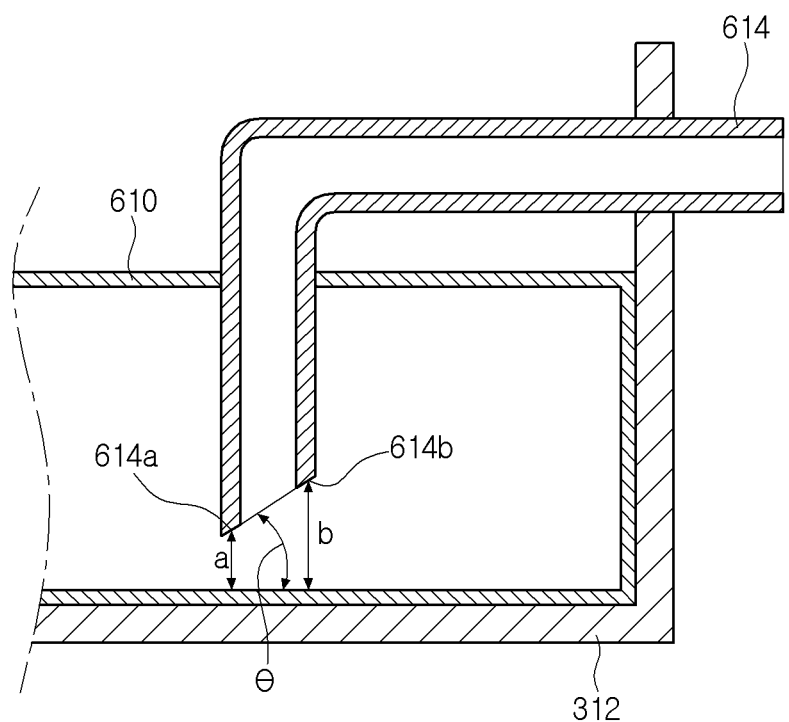
FIG. 7 is a cross-sectional view illustrating a coupled structure of a water tank according to the third embodiment.

FIG. 5 is a perspective view of a steam cooking appliance according to a third embodiment, FIG. 6 is a partial perspective view of a drawer according to the third embodiment, and FIG. 7 is a cross-sectional view illustrating a coupled structure of a water tank according to the third embodiment.

Referring to FIGS. 5 to 7, a water tank 610 of a steam cooking appliance 1 according to the current embodiment may include a drawer unit 300.

The drawer unit 300 may include a drawer 310 including an drawer outer wall 312 having a box shape with a top surface opened, a drawer accommodation space 320 for accommodating the drawer 310, a drawer accommodation partition wall 322 defining the drawer accommodation space 320, and a spaced space 301 defined between the drawer accommodation partition wall 322 and an outer wall 11 of a main body 10.

A steam device 600 may include the water tank 610 disposed within the drawer 310, a water supply tube 620 communicating with the water tank 610 in a state where the drawer 310 is inserted into the drawer accommodation space 320, a water supply pump 630 provided in the water supply tube 620, and a water supply amount adjustment unit 640.

The water tank 610 may be separately coupled to the drawer 310. The water tank 610 may be supported by at least one surface of inner surfaces of the drawer 310. For example, the water tank 610 may have a configuration that is supported by an inner side surface, an inner bottom surface, and an inner rear surface of the drawer 310.

The water tank 610 may include a water tank stopper 612 for opening or closing a hole through which water is supplemented into the water tank 610 and a supply part 614 communicating with the water tank 610 and the water supply tube 620.

The water tank stopper 612 may open or close the water injection hole defined in the water tank 610. Alternatively, water may be injected through a hole connected to the supply part 614 without providing the water injection hole and the water tank stopper 612. For another example, the water tank 610 may include a water tank body having an opened side and a tank body cover for covering the opened portion of the water tank body. Thus, after the water tank cover is separated, the water may be injected.

An inflow side of the supply part 614 may pass through one surface of the water tank 610 to extend to a bottom surface of the water tank 610. At least one portion of an inflow-side end of the supply part 614 may spaced from the bottom surface of the water tank 610.

An end of the inflow side of the supply part 614 may be inclined. That is, a height a from a bottom surface of the water tank 610 to one end 614a of the inflow side of the supply part 614 is less than that b from the bottom surface of the water tank 610 to the other end 614b of the inflow side of the supply part 614. As a result, due to a manufacturing tolerance or assembly tolerance, it may prevent the inflow side of the supply part 614 from being blocked by the bottom surface of the water tank 610.

The drawer 310 may include a separation prevention member 313 for supporting a side of the water tank 610.

The separation prevention member 313 may be coupled to the drawer 310 in a state where the water tank 610 is mounted on the drawer 310 to prevent the water tank 610 from being separated from the mounted position thereof.

The supply part 614 may pass through the drawer outer wall 312 to protrude backward from the drawer 310. That is, the supply part 614 may protrude in an insertion direction of the drawer 310.

The water supply tube 620 may have one side connected to a hole defined in the drawer accommodation partition wall 322 and the other wall 322 connected to the steam supply unit 650. The hole defined in the accommodation partition wall 322 may be defined in a position that corresponds to the supply part 614.

The water supply pump 630 and/or the water supply amount adjustment unit 640 may be disposed in the spaced space 301.

When the drawer 310 is completely inserted into the drawer accommodation space 320, the supply part 614 may communicate with the water supply tube 620 to guide the water within the water tank 610 to the water supply tube 620. The supply part 614 may have a check valve structure that is disclosed in Korean Patent Publication No. 10-2006-0117571 and a structure using an elastic body and a pressing part which are disclosed in Korean Patent Registration No. 10-0715610. Through the above-described structure, in a state where the drawer 310 is withdrawn, it may prevent the water received in the water tank 610 from leaking.

When the drawer 310 is withdrawn from the drawer accommodation space 320, the communication between the supply part 614 and the water supply tube 620 may be blocked. In this case, to prevent the water from flowing from the water supply tube 320, the water supply amount adjustment unit 640 may be blocked.

Alternatively, the supply part 614 may be disposed in the accommodation partition wall 322.

Figure 8:
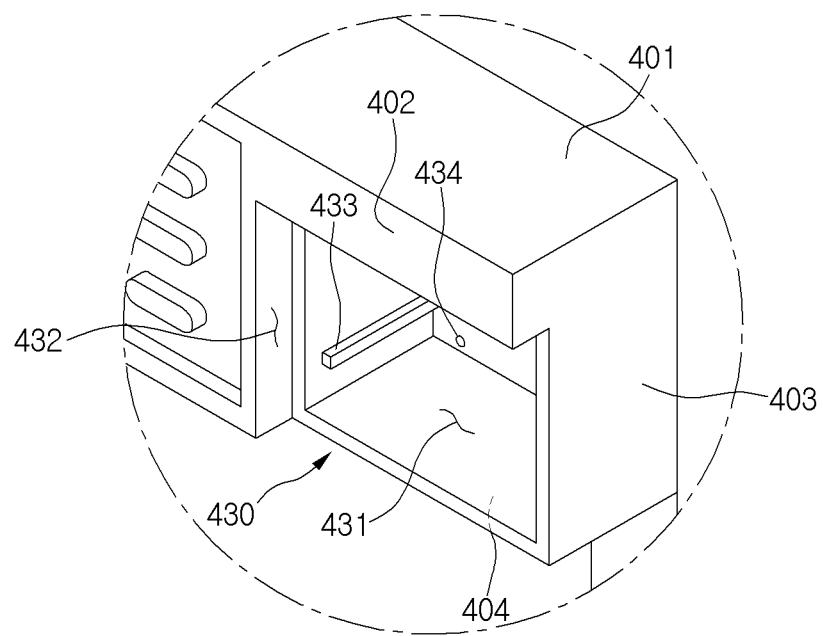
FIG. 8 is a partial perspective view of a backguard according to a fourth embodiment.
Figure 9:
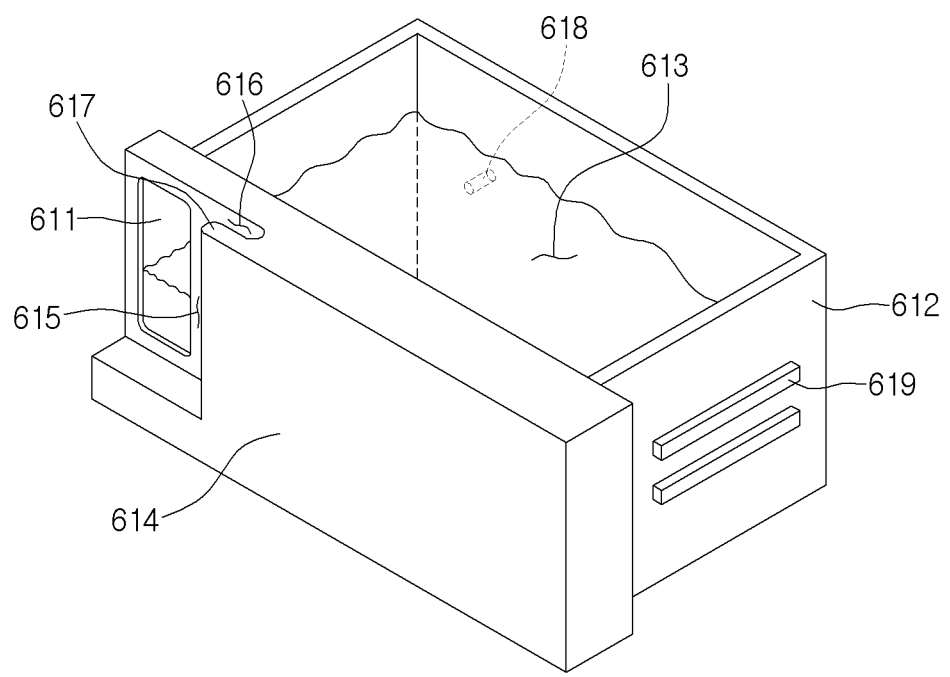
FIG. 9 is a perspective view of a water tank according to the fourth embodiment.

FIG. 8 is a partial perspective view of a backguard according to a fourth embodiment, and FIG. 9 is a perspective view of a water tank according to the fourth embodiment.

Referring to FIGS. 8 and 9, a water tank 610 according to the current embodiment may be inserted into or withdrawn from a backguard 400.

The backguard 400 may include a water tank insertion space 430 in which the water tank 610 is inserted. The water tank insertion space may have a size and shape which correspond to those of the water tank 610.

One surface of a front surface 402, a side surface 403, and a bottom surface 404 of the backguard 400 may be recessed to form the water tank insertion space 430. FIG. 8 illustrates a case in which the water tank insertion space 430 is recessed backward from the front surface 402 of the backguard 400.

The water tank insertion space 430 may include a case insertion space 432 inserted into a water tank case 612, a cover accommodation space 432 in which a water tank cover 614 is accommodated, a first guide part 433 disposed on an inner wall of the case insertion space 431 to guide the water tank case 612, and an inflow hole 434 defined in a rear wall of the case insertion space 431 and connected to the water supply part 620.

At least one edge of the water tank insertion space 430 may be stepped. That is, the case insertion space 431 may have a width less than that of the cover accommodation space 432.

The cover accommodation space 432 may be recessed from one surface of the backguard 400 to accommodate the water tank cover 614, and the case insertion space 431 may be further recessed from the one surface to accommodate the water tank case 612.

At least one edge of the cover accommodation space 432 may accord with the edge of the backguard 400. That is, the cover accommodation space 432 may be defined in the edge of the backguard 400. For example, the cover accommodation space 432 may be defined by cutting the edge of the backguard 400. As illustrated in FIG. 7, a left edge and lower edge of the backguard 400 may be cut to define the cover accommodation space 432. In this case, a user may grasp the edge of the water tank cover 614 that is exposed to a side of the edge of the backguard to easily insert or withdraw the water tank 610.

The first guide part 433 may be a rib that protrudes from the inner wall of the water tank insertion space 430. However, the present disclosure is not limited to a kind of first guide part 433. For example, other guide units such as a roller may be used.

The inflow hole 434 may be a hole through which the water received in the water tank 610 is introduced into the water supply tube 620. The inflow hole 434 may be connected to the water supply tube 620.

The water tank 610 may include a window 611, the water tank case 612 having a water receiving space 613 therein, the water tank case 614 disposed on a front surface of the water tank case 612 to cover the water tank case 612, a recess part 615 recessed backward from a front surface of the water tank cover 614, a handle part 617 defined by a handle groove 616 that is recessed from the recess part 615 in one direction, a supply part 618 supplying the water received in the water tank 610 to the inflow hole 434, and a second guide part 619 guiding the insertion or withdrawal of the water tank 610 into the water tank insertion space 430.

One surface of the water tank case 612 may be opened so that the user supplements water into the water receiving space 613. The water tank cover 614 may prevent foreign substances from being introduced from the outside to the water receiving space 613.

The recess part 615 may be defined in the edge of the water tank cover 614. To improve user's visibility, the window 611 may be disposed in the recess part 615.

The handle groove 616 may be substantially perpendicular to a direction in which the recess part 615 is recessed. In consideration of the user's visibility, a cross section of the handle groove 616 may have a curved shape.

The supply part 618 may be disposed on a rear wall of the water tank case 612. When the water tank 610 is mounted in the water tank insertion space 430, the supply part may communicate with the inflow hole 434. On the other hand, the supply part 618 may be disposed in the water tank insertion space 430.

The second guide part 619 may be disposed at a position that corresponds to the first guide part 433 to guide the insertion of the water tank 610 into the water tank insertion space 430.

For example, the second guide part 619 may be a rib that protrudes from an outer wall of the water tank case 612. However, the present disclosure is not limited to a kind of second guide part 619.

Figure 10:
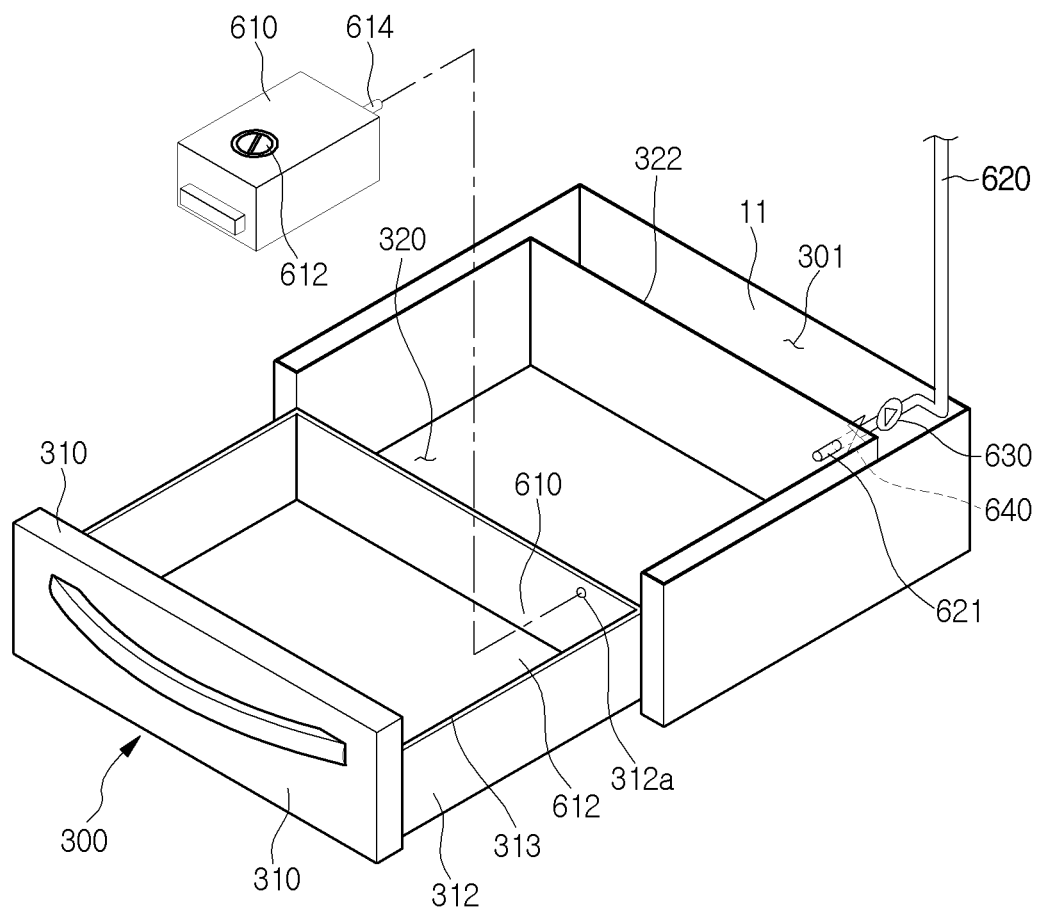
FIG. 10 is a partial perspective view of a drawer unit according to a fifth embodiment.
Figure 11:
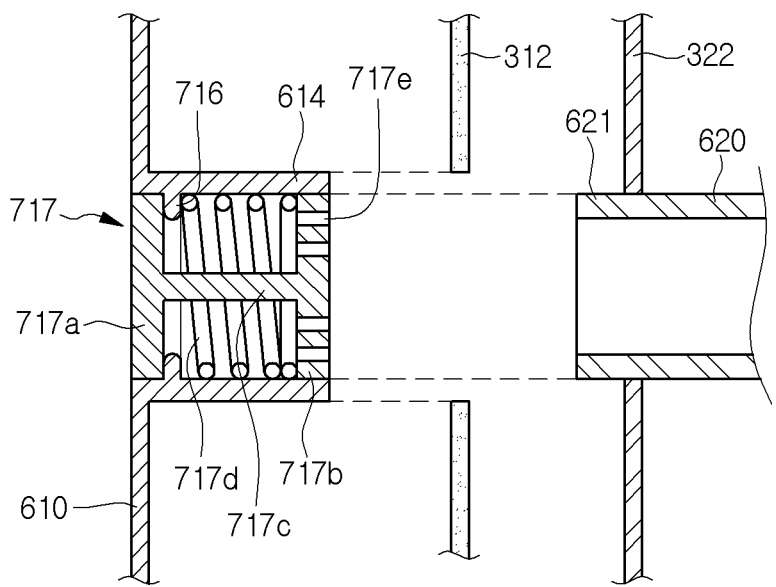
FIG. 11 is a cross-sectional view illustrating a coupled structure of a water tank according to the fifth embodiment.

FIG. 10 is a partial perspective view of a drawer unit according to a fifth embodiment, and FIG. 11 is a cross-sectional view illustrating a coupled structure of a water tank according to the fifth embodiment. If there are no contrary descriptions, the descriptions of the steam cooking appliance 1 according to the first embodiment may be applied to the current embodiment.

Referring to FIGS. 10 and 11, a water tank 610 may be separably coupled to a drawer unit 300 according to the current embodiment.

A guide hole 312a in which a supply part 614 for guiding water from a water tank 610 to a water supply tube 620 is inserted may be defined in one side of a drawer outer wall 312. The guide hole 312a may have a diameter corresponding to that of the supply part 614. The support part 614 may be inserted into the guide hole 312a to prevent the water tank 610 from being shaken within a drawer 310. A separation prevention member for restricting movement of the water tank 610 in a state where the water tank 610 is mounted may be further disposed on the drawer 310.

The water tank 610 may include a water tank stopper 612 and the supply part 614. Also, the water supply tube 620 may include an inflow part 621 coupled to the supply part 614. The inflow part 621 may be opened in a direction in which the drawer 310 is withdrawn. That is, the inflow part 621 may pass through a drawer accommodation partition wall 322 and then be exposed to a drawer accommodation space 320.

The supply part may be disposed on a surface facing an inflow side of the water supply tube 620 in the water tank 610. Water received in the water tank 610 may be introduced into the inflow part 621 through the supply part 614.

The supply part may include a protrusion 716 that protrudes into the supply part 614 and an opening and closing member 717 for selectively discharging the water received in the water tank 610.

The opening and closing member 717 may open the supply part 614 when the supply part 614 is coupled to the inflow part 621 and may close the supply part 614 when the supply part 614 is separated from the inflow part 621.

The opening and closing member 717 may include a blocking part 717a for selectively blocking a hole defined in the supply part 614, a head part 717b having a water supply hole 717e, a connection part 717c connecting the blocking part 717a to the head part 717b, and an elastic body 717d for elastically support the blocking part 717a. Hereinafter, the state in which the opening and closing member 717 blocks the supply part 614 will be described.

The blocking part 717a may be supported by one side of the protrusion 716. Also, the head part 717b may be disposed on a side opposite to that of the blocking part 717a with respect to the protrusion 716. That is, the head part 717b may be disposed on the other side of the protrusion 716. The support part 717c may connect the head part 717b to the blocking part 717a to transmit an external force transmitted into the head part 717b to the blocking part 717a.

The elastic member 717d has one side supported by the protrusion 716 and the other side supported by the head part 717b. That is, the elastic body 717d may be disposed between the protrusion 716 and the head part 717b. The elastic body 717d may be disposed on a side opposite to that of the blocking part 717a with respect to the protrusion 716.

The inflow part 621 may guide water from the supply part 614 to the water supply tube 620. The inflow part 621 may extend in a direction parallel to that in which the water tank 610 is attached or detached. The water supply tube 620 may pass through the drawer accommodation partition wall 322 to protrude toward the drawer 310. In this case, the protruding portion may be understood as the inflow part 621.

Hereinafter, an operation of the opening and closing member 717 will be described. The blocking part 717a may maintain the blocked state of the supply part by an elastic force of the elastic body 717d. That is, if an external force is not applied to the opening and closing member 717, the water received in the water tank 610 may not be discharged through the supply part 614.

When the water tank 610 is coupled to the drawer 310, the supply part 614 may protrude to a rear side of the drawer 310 through a guide hole 312a defined in the drawer outer wall 312.

In the state where the water tank 610 is coupled to the drawer 310, when the drawer 310 is inserted into the drawer accommodation space 320, the supply part 614 may be coupled to the inflow part 621 to communicate with the inflow part 621. Also, the inflow part 621 may press the head part 717b upward. In this point, the inflow part 621 may be called a "pressing member". When the head part 717b is pressed, the blocking part 617a connected to the head part 717b by the support part 717c may move into the water tank 610 (in a left direction in FIG. 6). Thus, the blocking part 617a may be spaced apart from the protrusion 716, and the water tank 617 may communicate with the water supply tube 620 through the water supply hole 717e.

On the other hand, when the drawer 310 is withdrawn from the drawer accommodation space 320, the inflow part 621 may be separated from the supply part 614 to release the communication between the inflow part 621 and the supply part 614. Also, the opening and closing member 717 may return to its blocking state by an elastic force of the elastic body 717d.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A steam cooking appliance comprising:
a main body having a cavity that provides a cooking space in which a food is accommodated;
a water tank separably coupled to the main body outside the cavity to store water;
a steam supply unit outside the cavity to heat water supplied from the water tank to generate steam; and
a backguard extending upward from an upper portion of the main body and comprising a control unit,
wherein the steam supply unit supplies the steam into the cooking space within the cavity,
wherein the water tank comprises:
a water tank case having a water receiving space therein; and
a water tank cover on a side of the water tank case to prevent foreign substances from being introduced into the water receiving space from the outside,
wherein the backguard comprises:
a cover accommodation space recessed from one surface of the backguard to accommodate the water tank cover; and
a case insertion space that is further recessed from the one surface of the backguard to insert the water tank case therein, and
wherein the water tank is on the backguard.

2. The steam cooking appliance according to claim 1, wherein the steam supply unit is fixed to one sidewall of the cavity.

3. The steam cooking appliance according to claim 2, further comprising:
a water supply tube to guide the water stored in the water tank to the steam supply unit; and
a water supply pump disposed on the water supply tube to allow the water received in the water tank to flow into the steam supply unit through the water supply tube.

4. The steam cooking appliance according to claim 1, wherein the water tank comprises a window of a transparent material in the backguard so that an inside of the water tank is visible from an outside.

5. The steam cooking appliance according to claim 1, wherein the cover accommodation space is defined in an edge of the backguard.

6. The steam cooking appliance according to claim 1, wherein the water tank further comprises:
a recess part recessed backward from a front surface of the water tank cover; and
a handle part defined by a handle groove that is recessed from the recess part in one direction.

7. The steam cooking appliance according to claim 3, wherein the water supply pump is within the backguard.

8. A steam cooking appliance comprising:
a main body having a cavity that provides a cooking space in which food is accommodated;
a water tank separably coupled to the main body outside the cavity to store water; and
a steam supply unit outside the cavity to heat water supplied from the water tank to generate steam,
wherein the steam supply unit supplies the steam into the cooking space within the cavity,
wherein the main body comprises:
a drawer unit; and
a water supply tube connected to the steam supply unit,
wherein the drawer unit comprises a drawer that is insertable into or withdrawable from the main body, for accommodating food or a container, and
a drawer accommodation space in which the drawer is accommodated; and
wherein the water tank is mounted on the drawer.

9. The steam cooking appliance according to claim 8, wherein the drawer comprises:
a drawer outer wall having a box shape with a top surface opened; and
a supply part to allow the water tank to communicate with the water supply tube,
wherein, when the drawer is inserted in the drawer accommodation space, the supply part communicates with the water supply tube to guide the water within the water tank to the water supply tube.

10. The steam cooking appliance according to claim 9, wherein the drawer unit further comprises a drawer accommodation partition wall defining a drawer accommodation space, and
wherein an inflow hole corresponding to the supply part is defined in the drawer accommodation partition wall, and the water supply tube is in the inflow hole.

11. The steam cooking appliance according to claim 10, further comprising a water supply pump on the water supply tube,
wherein the water supply pump is between the drawer accommodation partition wall and an outer wall of the main body.

12. The steam cooking appliance according to claim 8, wherein the water tank comprises a supply part to guide the water within the water tank to the water supply tube, and
wherein an end of the supply part is within the water tank and spaced apart from a bottom surface of the water tank.

13. The steam cooking appliance according to claim 8, wherein the supply part comprises an opening and closing member to selectively discharge the water received in the water tank.

14. A steam cooking appliance comprising:
a main body to define an outer appearance;
a cavity on one side of the main body to define a cooking space to receive food;

a drawer unit on another side of the main body, the drawer unit comprising a drawer that is insertable into or withdrawable from the main body and warming a container accommodated in the drawer;

a water tank on the drawer, the water tank capable of being inserted or withdrawn together with the drawer;

a steam supply unit heating water introduced from the water tank to generate steam, the steam supply unit comprising an injection part to supply the generated steam into the cooking space;

a water supply tube to guide the water to the steam supply unit;

a supply part on the water tank to supply the water within the water tank into the water supply tube; and an opening and closing member on the supply part, wherein the opening and closing member opens the supply part when the drawer is inserted into the main body and closes the supply part when the drawer is withdrawn from the main body.

* * * * *